(12) United States Patent
Ramminger

(10) Patent No.: US 9,539,962 B2
(45) Date of Patent: Jan. 10, 2017

(54) ELECTRICAL SYSTEM FOR A VEHICLE

(71) Applicant: GM GLOBAL TECHNOLOGY OPERATIONS LLC, Detroit, MI (US)

(72) Inventor: Peter Ramminger, Bausendorf (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 479 days.

(21) Appl. No.: 14/205,622

(22) Filed: Mar. 12, 2014

(65) Prior Publication Data

US 2014/0265352 A1 Sep. 18, 2014

(30) Foreign Application Priority Data

Mar. 13, 2013 (DE) .................. 10 2013 004 279

(51) Int. Cl.
*B60R 16/03* (2006.01)
*F02N 11/08* (2006.01)

(52) U.S. Cl.
CPC ........... *B60R 16/03* (2013.01); *F02N 11/0862* (2013.01); *F02N 11/0814* (2013.01); *F02N 2250/02* (2013.01)

(58) Field of Classification Search
CPC ................................................ B60R 16/03
USPC ................. 307/9.1, 10.7; 290/38 R
See application file for complete search history.

(56) References Cited

U.S. PATENT DOCUMENTS

| | | | |
|---|---|---|---|
| 3,556,069 A * | 1/1971 | Minks | F02P 3/0884 123/143 C |
| 8,487,573 B2 * | 7/2013 | Nakamura | F02N 11/087 290/38 R |
| 2010/0078997 A1 * | 4/2010 | Chen | B60L 1/00 307/31 |

FOREIGN PATENT DOCUMENTS

| | | |
|---|---|---|
| DE | 19921453 C1 | 8/2000 |
| DE | 102009042977 A1 | 5/2010 |
| DE | 102010042396 A1 | 4/2012 |

* cited by examiner

*Primary Examiner* — Joseph Chang
(74) *Attorney, Agent, or Firm* — Lorenz & Kopf LLP

(57) ABSTRACT

A vehicle electrical system for a vehicle is described which includes an electrical energy source supplying a first vehicle electrical system branch and a second vehicle electrical system branch. The first vehicle electrical system branch include a first electrical consumer with an inrush current requirement and a first inductance connected in series with the first consumer. The second vehicle electrical system branch includes a second electrical system voltage-sensitive consumer with a minimum system voltage requirement and a second inductance connected to the second consumer in series or in parallel. The first vehicle electrical system branch and the second vehicle electrical system branch are connected electrically in parallel to one another, and the first inductance and the second inductance are magnetically coupled to one another.

14 Claims, 4 Drawing Sheets

ELECTRICAL SYSTEM FOR A VEHICLE

CROSS REFERENCE TO RELATED APPLICATION

This application claims priority to German Patent Application No. 102013004279.8 filed Mar. 13, 2013, which is incorporated herein by its entirety.

TECHNICAL FIELD

An electrical system for a vehicle is described and more particularly an improved electrical system for limiting voltage drops to a tolerable dimension despite a high inrush current requirement of a first electrical load.

BACKGROUND

From the publication DE10 2010 042 396 A1 a method for maintaining a predetermined voltage in a battery-supported electrical system of a vehicle during the operation of an electric starter motor is known. This conventional method includes the steps of: operating the electrical starter motor on the electrical system of the vehicle during a first period in series with a limiting resistor in order to limit the current flowing through the starter motor; and of operating the electric starter motor on the electrical system of the vehicle during a second period with a reduced limiting resistance in order to increase a power converted by the starter motor. Here, a transition from the first to the second period is controlled based on electrical characteristics sampled on the limiting resistor during the first period.

SUMMARY

According to an aspect of the application, there is a need for creating a vehicle electrical system which cost-effectively attenuates the lowering of the vehicle electrical system for second consumers when switching on a first consumer or electrical load, such as for example a starter motor of an internal combustion engine, and to cost-effectively improve the existing vehicle electrical system structures in such a manner that voltage drops can be limited to a tolerable dimension despite a high inrush current requirement of a first consumer. According to a further aspect of the application, there is a need for providing a vehicle with such a vehicle electrical system.

An embodiment of the present disclosure relates to an electrical system for a vehicle. The vehicle electrical system includes at least one electrical energy source, for example in the form of at least one electrical energy storage unit, in particular of at least one battery, at least one accumulator and/or at least one capacitor, for example at least one super capacitor, in the form of at least one fuel cell and/or in the form of at least one generator, which supplies a first vehicle electrical system branch and a second vehicle electrical system branch. The first vehicle electrical system branch includes at least one first electrical consumer with an inrush current requirement and a first inductance connected in series with the first consumer. The second vehicle electrical system branch includes at least one second electrical mains voltage-sensitive consumer with a minimum mains voltage requirement and a second inductance connected to the second consumer in series or in parallel. The first vehicle electrical system branch and the second vehicle electrical system branch are electrically connected in parallel to one another and the first inductance and the second inductance are magnetically coupled to one another.

Such a vehicle electrical system division into two vehicle electrical system branches, which are inductively coupled, has the advantage that the profile of the current in the first inductance because of the high current increase of the first consumer causes an additional induction voltage in the second inductance, which reduces or attenuates and excessive lowering of the operating voltage in the second vehicle electrical system, which is connected parallel with the first vehicle electrical system during the switching-on of the first consumer.

This is based on the consideration that an internal combustion engine of a motor vehicle is typically started up by means of an electric starter motor. The energy that is required for the starting is typically taken from an electrochemical energy storage unit of the electrical system of the vehicle. Since such electrochemical energy storage units have a limited energy storage capacity, a vehicle electrical system voltage, through the starter motor, which has a high inrush current requirement in the first milliseconds of the starting operation, can drop so severely that second or other consumers can possibly no longer be supplied with an adequate vehicle electrical system voltage. In particular consumers such as are controlled with a microprocessor are voltage-sensitive and react with failure or restriction of their function at least for a predetermined time span in the case of a minor undershooting of a minimum vehicle electrical system voltage for example of 7V. Such voltage-sensitive second consumers can be control units, which are decisive for the operation and the safety of the vehicle.

In contrast to the conventional system described in the Background above, in which a multiplicity of sensors is required in order to time-wise attenuate the voltage drop in the vehicle electrical system to the extent that a minimum voltage can be maintained in the vehicle electrical system, this is made possible in the case of the mentioned embodiment by simply increasing the line induction characteristics of the supply lines to the consumers by creating regions with increased induction, which are magnetically coupled to one another. This configuration requires the least possible change in the installation and the arrangement of the supply lines to the different consumers relevant to one another. Thus, the regions of increased supply line inductance can for example be integrated in the cable structure in a simple and cost-effective manner by means of a preassembled component, in which the increased supply line inductances are coupled to one another.

With the help of this inductive cable supply line component to be produced in a cost-effective manner and suitable dimensioning of the inductances the voltage drop on account of the high inrush current requirement of the first consumer in the first vehicle electrical system branch, can be significantly reduced for the second vehicle electrical system branch with consumers that have a minimum system voltage requirement.

In an embodiment, the second inductance in this case is connected in series with the second consumer. Both the coupling as well as the inductances to be coupled can be increased by using ferromagnetic materials as a common magnetic core, round about which in a further embodiment of the invention a first inductance in the form of a primary winding from a supply line to the first consumer and the second inductance in the form of a secondary winding from a supply line to the second consumer are provided.

Owing to the high induction current during the switching-on operation of the first consumer, the number of windings of the first inductance can be smaller by a multiple than the number of windings of the second inductance. This is advantageous more so since the supply line to the first consumer with a high inrush current requirement has a substantially larger cross section in the supply line to an at least second consumer. With such a thinner supply line for the second consumer in the second vehicle electrical system branch it is possible in a simple manner to achieve a significantly larger number of windings than for the supply line to the first consumer for creating an increased supply line inductance.

In an embodiment of the present disclosure, the first inductance and the second inductance are magnetically coupled or wound to one another in an anti-parallel manner In a further embodiment, it is provided to couple an energy storage element into the second vehicle electrical system branch by means of a coupling circuit. Such an energy storage element has the advantage that it stores a rapidly accessible charge such as for example is initially available in the case of the nominal vehicle electrical system voltage and thus also for the energy storage element of the coupling circuit in the second vehicle electrical system branch.

When a system voltage drop occurs in the first vehicle electrical system branch an electrical charge can be directly accessed from the energy storage element connected in parallel with the second consumer via a discharge circuit of the coupling circuit in the second vehicle electrical system branch. Thus, with this embodiment, a coupling circuit with at least one additional energy storage element and at least one additional discharge circuit are present in addition to the first and the second inductance and the magnetic coupling in the second vehicle electrical system branch.

Here, in the case of a system voltage drop triggered by the first consumer the stored electrical charge of the additional storage element can be automatically made available to the second consumer connected in parallel. For this reason, the first inductance and the second inductance with this embodiment of the invention are not coupled to one another in an anti-parallel manner, but are coupled parallel to one another.

In a further configuration, a first system node for the coupling circuit is provided for coupling, via which node the energy storage element is connected to the second inductance and the discharge circuit. Furthermore, the energy storage element in this configuration is connected to a second vehicle electrical system node via the discharge circuit, which interacts with the second consumer and an impedance element, via which there is a connection to a vehicle electrical system voltage pole.

This slightly more complex structure of the second vehicle electrical system branch compared with the previous embodiment has the advantage that through suitable selection of the energy storage element a major voltage drop when switching on the first consumer can be cushioned. This embodiment also has the advantage that no additional limiting resistance and no sensors for detecting characteristics of the limiting resistance for controlling a second inrush current period of the first consumer are required.

A further improvement can be achieved in that a discharge circuit interacts with a switching pulse generator. This switching pulse generator in turn can be regulated via a control and regulating unit in such a manner that in normal operation the additional energy storage unit remains charged and the switching pulse generator triggers or portions and meters the discharging of the additional energy storage unit to the second consumer in the second vehicle electrical system branch connected in parallel via a switching pulse control as a function of the voltage drop only when a vehicle electrical system voltage drop is detected.

Furthermore, the first consumer in the first vehicle electrical system branch in an embodiment is an electric starter motor of an internal combustion engine and the second consumer in the second vehicle electrical system branch is a system voltage-sensitive control unit, such as preferentially an ESP-module (electronic stability program), ECU-module (engine control unit) or an automatic transmission control module (AT control module, automatic transmission control module). Such modules are usually microprocessor-controlled and therefore system voltage-sensitive with respect to a minimum system voltage requirement.

A further aspect of the present disclosure relates to a vehicle having a vehicle electrical system of at least two vehicle electrical system branches discussed above. An embodiment of the present disclosure furthermore relates to a vehicle having a start/stop system for an internal combustion engine of the vehicle, wherein the start/stop system is formed for the automatic switching-off and starting-up of the internal combustion engine. The vehicle electrical system of two vehicle electrical system branches, which through magnetically coupled inductances of their supply line can cushion a vehicle electrical system voltage drop, makes possible a frequent start/stop operation of the internal combustion engine which does not impair the safety of the vehicle.

BRIEF DESCRIPTION OF THE DRAWINGS

The present disclosure will hereinafter be described in conjunction with the following drawing figures, wherein like numerals denote like elements, and.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
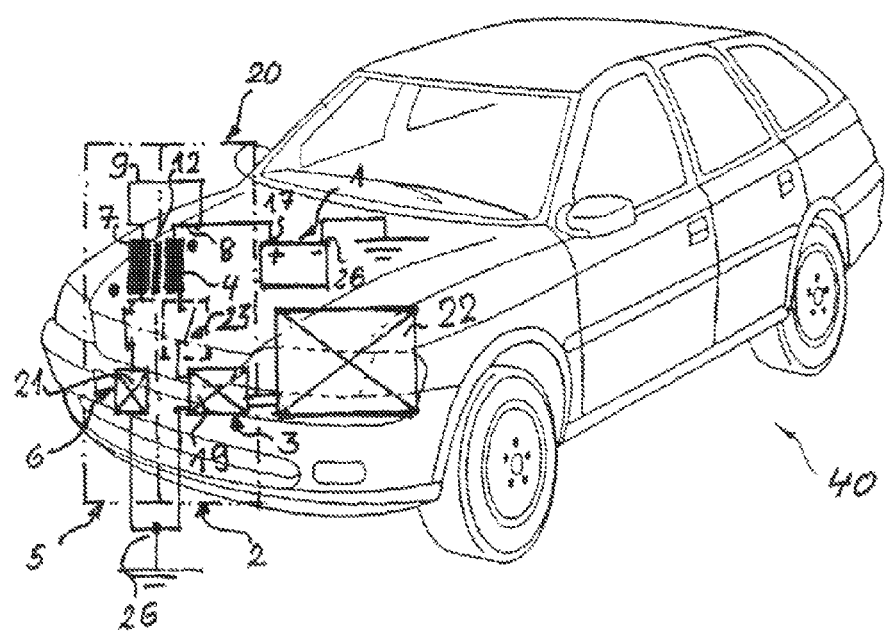
FIG. 1 shows a schematic representation of a vehicle with consumers in a vehicle electrical system.

FIG. 1 shows a schematic representation of a vehicle 40 in the form of a motor vehicle with consumers 3 and 6 in a vehicle electrical system 20. The vehicle electrical system 20 includes a first vehicle electrical system branch 2 and a second vehicle electrical system branch 5. In the first vehicle electrical system branch 2 a starter motor 19 as a first consumer 3 is arranged, which for example in a start/stop mode starts an internal combustion engine 22 with the help of a start/stop system 23. Such a starter motor 19 has a high inrush current requirement in the first milliseconds, which can amount to several hundred compares. The vehicle electrical system 20 with its two electrical system branches 2 and 5 is supplied with current and voltage from an electrical energy source in the form of an electrical energy storage unit 1.

With each starting operation, a drop of the voltage in the vehicle electrical system branches 2 and 5 occurs through the high inrush current increase of several 100 amperes per millisecond for the starter motor 19. In order to counteract this drop in the vehicle electrical system branches 2 and 5, a first inductance 4 is arranged in the vehicle electrical system branch 2 in series with the first consumer 3, which via a magnetic core 12 is coupled to a second inductance 7, which is arranged in the second vehicle electrical system branch 5 in series with a second consumer 6.

Such a second consumer 6 in this embodiment is a control unit 21 with a microprocessor. Such microprocessors are system voltage sensitive and have a minimum vehicle system voltage requirement, such as for example 7V, which should not be undershot in order to ensure the functionality of the control unit 21 despite multiple start/stop operation of the vehicle 40.

Through the anti-parallel magnetic coupling of the first inductance 4 to the second inductance 7 indicated here with dots, the high current increase in the first vehicle electrical system branch 2 of several hundred volts per millisecond generates an induction voltage in the second inductance 7 of the second vehicle electrical system branch 5, which counteracts and thereby cushions the dropping of the vehicle electrical system voltage in the vehicle electrical system branch 5. While in FIG. 1 the interaction of internal combustion engine 22, energy storage unit 1, starter motor 19 and start/stop system 23 in the vehicle electrical system branch 2 is schematically shown in principle, a diagram of a vehicle electrical system 20 according to a first embodiment of the invention is shown by FIG. 2.

Figure 2:
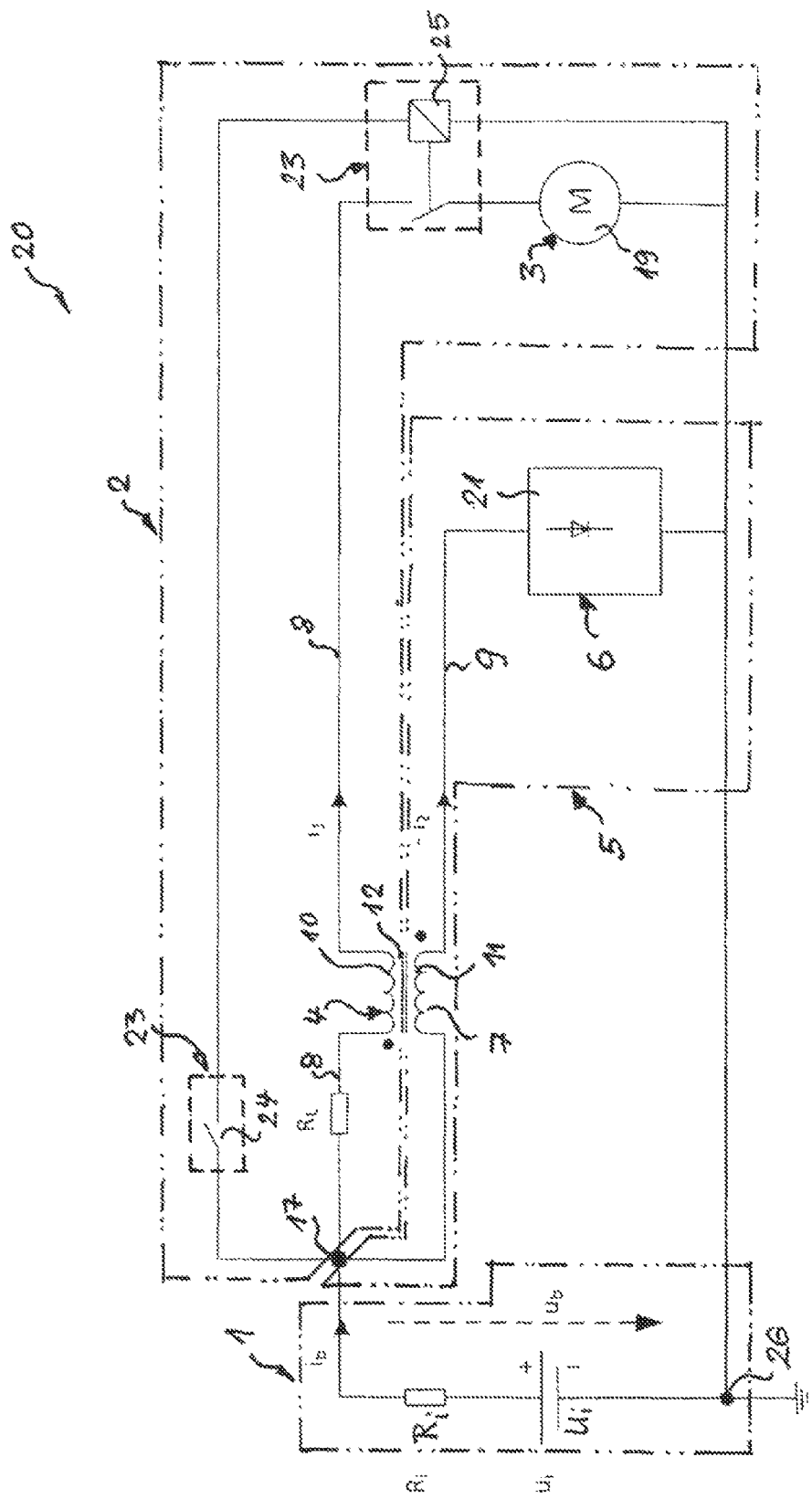
FIG. 2 shows a diagram of a vehicle electrical system according to a first embodiment in accordance with the present disclosure.

In FIG. 2, the limits of the storage unit and of the individual branches of the vehicle electrical system are illustrated with the help of double-dotted interrupted lines. The vehicle electrical system 20, which in this case has a first vehicle electrical system branch 2, which is arranged in parallel with a second vehicle electrical system branch 5, is supplied by an electrochemical energy storage unit 1. The electrochemical energy storage unit 1 is connected to a vehicle electrical system voltage pole 17 and an earth pole 26, between which a vehicle electrical system voltage UB is formed.

The schematically shown electrochemical energy storage unit 1 can generate via its complex internal resistance $R_i$ an inner source voltage $U_i$ of this vehicle electrical system voltage $U_b$ between the vehicle electrical system voltage pole 17 and the earth pole 26. However, through the complex internal resistance $R_i$, which includes both ohmic as well as capacitive and inductive components, the vehicle electrical system voltage is not maintained in the case of a high increase of an inrush current.

In order to counteract this voltage drop, the vehicle electrical system 20 in the embodiment according to FIG. 2 is divided into two parallel vehicle electrical system branches. In doing so, the first vehicle electrical system branch in addition to a first consumer 3 has a parallel branch with the starter motor 19, in which a starter relay 24 is arranged, which can be controlled by a start/stop system 23, wherein the starter relay 24 triggers a solenoid switch 25 which is closed in series, which is likewise part of the automatic start/stop system 23 and which connects the supply line 8 to the first consumer 3, the supply line 8 having a complex line resistance $R_L$. The inductive component of the complex line resistance $R_L$ can be amplified by forming a primary winding 10 to a first inductance, which in the first vehicle electrical system branch 2 is arranged in series with the first consumer 3.

Because of the high current, such a primary winding 10 can have a small number of windings, which is significantly lower than a second inductance 7, which is formed as secondary winding 11 of the supply line 9 to the second consumer 6 and has significantly more windings than the primary winding 10. Because of the high inrush current requirement in the first vehicle electrical system branch 2, an induction voltage is generated in the first vehicle electrical system branch 2 via magnetic coupling through a common magnetic core 12 in the secondary winding, which counteracts the lowering of the vehicle electrical system voltage.

Thus, through this connection, it can be made possible that the vehicle electrical system voltage at least in the second vehicle electrical system branch 2 maintains a level which corresponds to the minimum vehicle electrical system requirement of the second consumer 6 of for example 7V with a nominal battery voltage of 12V. Nominal battery voltage $U_b$ in this connection is to mean a battery voltage that is exposed to a time-invariant constant load.

Figure 3:
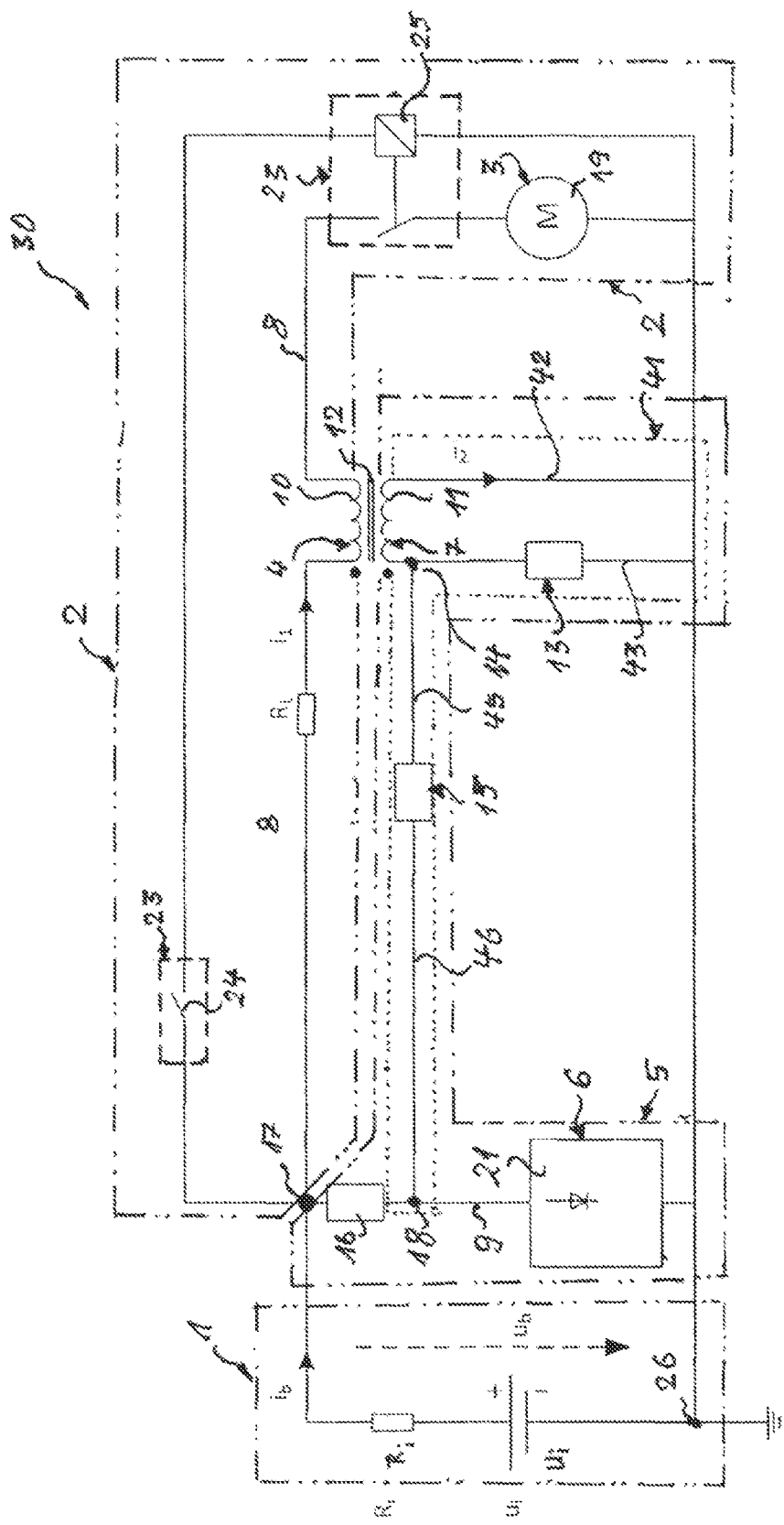
FIG. 3 shows a diagram of a vehicle electrical system according to a second embodiment.

FIG. 3 shows a diagram of a vehicle electrical system 30 according to a second embodiment of the invention. Components with same functions as in FIG. 2 are marked with the same reference characters and are not discussed separately. The electrochemical energy storage unit 1 is maintained unchanged and the first vehicle electrical system branch 2 is structured corresponding to FIG. 2. Merely the voltage supply in the second vehicle electrical system branch 5 was further improved by providing an additional coupling circuit 41. The coupling circuit 41 includes the second inductance 7, an additional energy storage element 13 in the form of a capacitor 27, a discharge circuit 15 and a first system node 14 and a second system node 18, with which the coupling circuit 41 is integrated in the second vehicle electrical system branch. With one connection, the second inductance is connected to the earth pole 26 via an electric line 42 and to the first system node 14 with a second connection. The additional energy storage element 13 is connected to the earth pole 26 with a first connection via an electrical line 43 and is connected to the first system node 14 with a second connection via the electrical line 44. The discharge circuit 15 is arranged between the first system node 14 and the second system node 18 and connected via the electrical lines 45 and 46 respectively.

The second system node 18 is in connection with the second consumer and is connected to the vehicle electrical system voltage pole via an impedance element 16. Through the integration of this coupling circuit 41 into the second vehicle electrical system branch 5 an additional energy storage element 13 is available in this second vehicle electrical system branch 5, which in this case is formed by a capacitor 27, and which interacts with the second inductance via the first system node.

This additional energy storage element 13 is able to make available the stored charge of the capacitor 27 to the second consumer 6 relatively quickly for offsetting a voltage drop in the second vehicle electrical system branch 4. The voltage drop is thus cushioned since the second consumer 6 in the form of a control unit 21 is connected to the additional energy storage element 13 via the second system node 18 in the second vehicle electrical system 5 and the discharge circuit 15.

Figure 4:
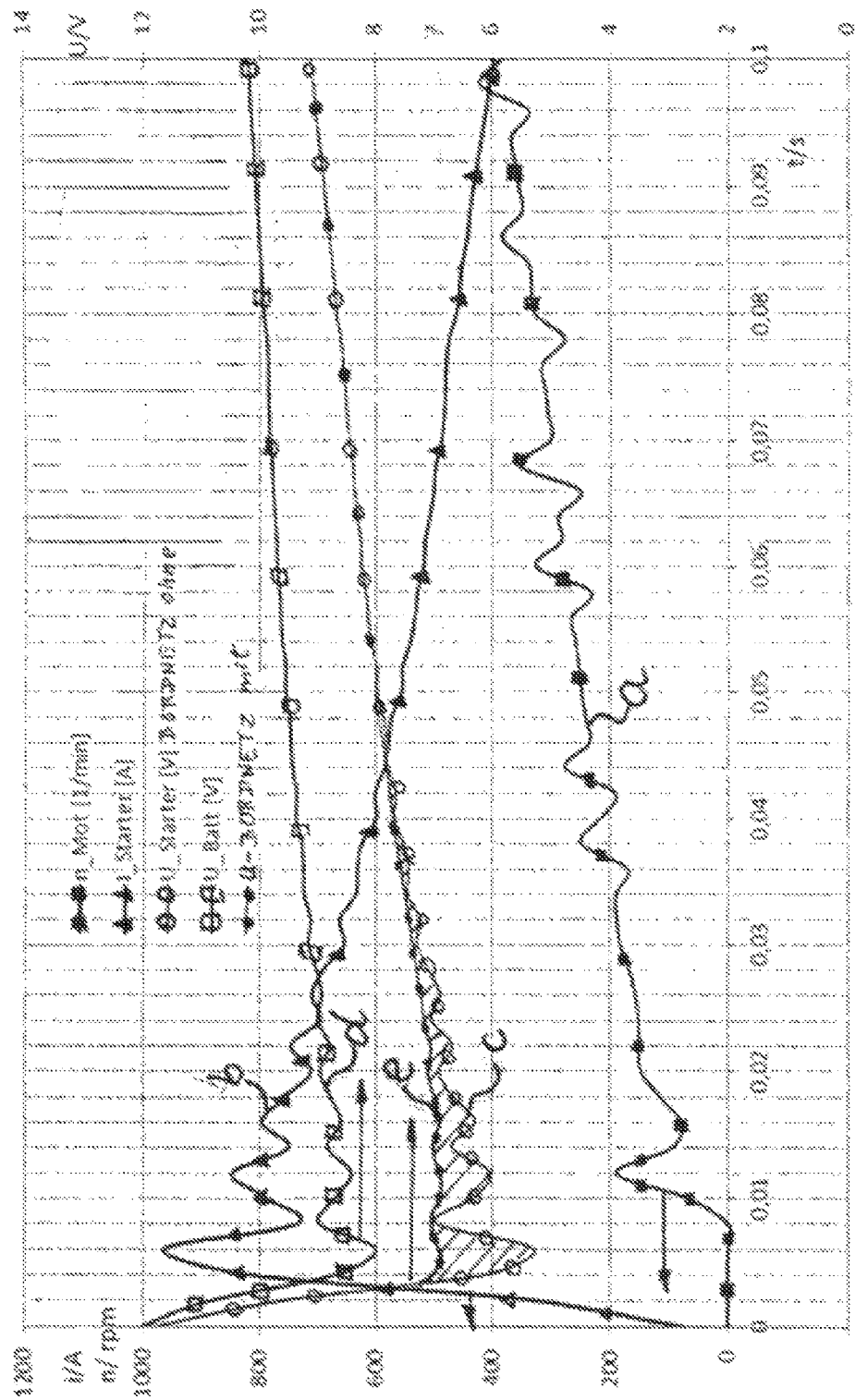
FIG. 4 exemplarily shows a diagram with voltage and current profiles in a vehicle electrical system during the switching-on of a starter motor during the first 100 milliseconds.

FIG. 4 shows a diagram with voltage and current profile in a vehicle electrical system during the switching-on of a starter motor during the first 100 milliseconds, which was obtained by means of a simulation. To this end, the time T in seconds is shown on the abscissa and on the left side of the ordinate the current i in ampere (A) and the rotational speed n in revolutions per minute (rpm) and on the ordinate on the right-hand side the voltage in volt (V) are plotted, wherein the voltage range is from zero to 14V and the current range is from zero to 1,200A.

As the curve a shows, the rotational speed n of the starter motor increases from zero to 400 rpm in the first 100 milliseconds. A current of up to 1,000A is drawn from the first 6 milliseconds from the electrochemical energy storage unit for this, as is shown by curve b. Within the first 100 milliseconds, this inrush current of the starter motor drops to 400A. This steep inrush current increase from 1,000A per 6 milliseconds causes a drop in the battery voltage, as shown by the curve d, wherein the battery voltage of initially 12V drops to 8V within the first 6 milliseconds and then recovers to approximately 10V during the first 100 milliseconds.

The voltage in the first vehicle electrical system branch, in which the steep current increase has the greatest effect, drops, as shown by the curve c, to far below 6V without the mentioned measures according to embodiments of the invention, as shown by FIG. 2, and remains below 7V for 8 milliseconds. This is not tolerable for some control units so that with the curve e it is shown how this voltage drop can be reduced in such a manner through the employed and magnetically coupled supply line inductances shown in the FIGS. 2 and 3 can be reduced in such a manner that a voltage of 7V within the circuit of the second consumer is not undershot.

While exemplary embodiments have been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A vehicle electrical system comprising:
an electrical energy source;
a first vehicle electrical system branch electrically connected to the electrical energy source and having at least one first electrical consumer with an inrush current requirement and a first inductance connected in series with the first electrical consumer;
a second vehicle electrical system branch electrically connected to the electrical energy source and having at least one second electrical consumer and a second inductance which is connected in series or parallel with the second electrical consumer, wherein the second electrical consumer is voltage-sensitive having a minimum system voltage requirement;
wherein the first vehicle electrical system branch and the second vehicle electrical system branch are connected in parallel with one another, and wherein the first inductance and the second inductance are magnetically coupled to one another.

2. The vehicle electrical system according to claim 1, wherein the second inductance is connected in series with the second consumer.

3. The vehicle electrical system according to claim 1, wherein the electrical energy source comprises an electrical energy storage unit.

4. The vehicle electrical system according to claim 1, further comprising;
a primary winding associated with the first inductance between a first supply line and the first consumer; and
a secondary winding associated with the second inductance between a second supply line to the second consumer.

5. The vehicle electrical system according to claim 4, wherein a number of windings of the primary winding is lower than a number of windings of the secondary winding.

6. The vehicle electrical system according to claim 4, further comprising a common magnetic core for the first and second inductances.

7. The vehicle electrical system according to claim 1, wherein the first inductance and the second inductance are magnetically coupled to one another in an anti-parallel manner.

8. The vehicle electrical system according to claim 1 further comprising:
a coupling circuit arranged in parallel with the second consumer and electrical energy source, the coupling circuit having a discharge circuit including a first system node connecting the electrical energy source to the discharge circuit between the second inductance and the electrical energy source, and a second system node connecting the second consumer the discharge circuit;
wherein the first inductance and the second inductance are coupled magnetically in parallel to one another and the second vehicle electrical system branch; and
wherein the energy storage element counteracts the system voltage drop in the case of a system voltage drop.

9. The vehicle electrical system according to claim 8, further comprising a switching pulse generator operably coupled to the discharge circuit of the coupling circuit in the second vehicle electrical system branch for interaction therewith.

10. The vehicle electrical system according to claim 1, wherein the first consumer in the first vehicle electrical system branch is an electric starter motor of an internal combustion engine.

11. The vehicle electrical system according to claim 1, wherein the second consumer in the second vehicle electrical system branch is a system voltage-sensitive control unit.

12. The vehicle electrical system according to claim 1, wherein the second consumer in the second vehicle electrical system branch is a system voltage-sensitive ESP module, ECU-module or an automatic transmission control module.

13. A vehicle in combination with the vehicle electrical system according to claim 1.

14. The vehicle according to claim 13, wherein the vehicle comprises a start/stop system operable for automatically starting and stopping an internal combustion engine of the vehicle.

* * * * *